Aug. 30, 1938.  V. J. CHAPMAN  2,128,799
ELECTRODE HOLDER
Filed March 5, 1936
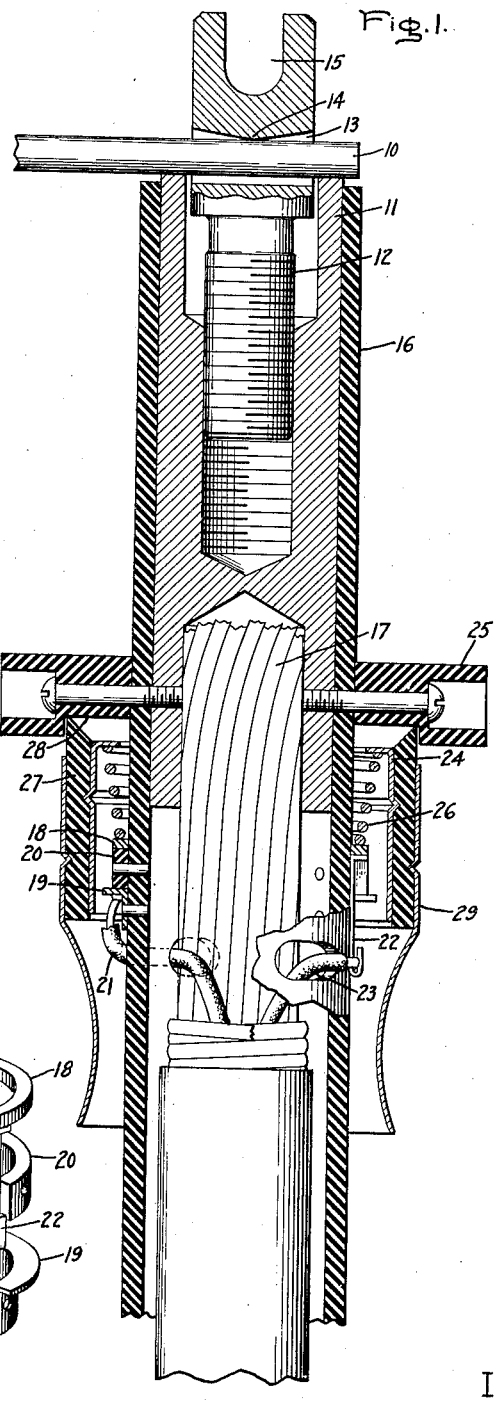
Inventor:
Verni J. Chapman,
by Harry E. Dunham
His Attorney.

Patented Aug. 30, 1938

2,128,799

UNITED STATES PATENT OFFICE 2,128,799

ELECTRODE HOLDER

Verni J. Chapman, Schenectady, N. Y., assignor to General Electric Company, a corporation of New York Application March 5, 1936, Serial No. 67,252

2 Claims. (Cl. 219—8)

My invention relates to electric arc welding apparatus and more particularly to those tools known as electrode holders.

It is an object of my invention to provide an electrode holder having a simplified and improved electrode screw clamp.

It is a further object of my invention to provide an electrode holder with a control switch having an operating member surrounding its handle and conveniently accessible in all hand grip positions to the operator's gripping hand.

Further objects of my invention will become apparent from the following description taken in connection with the accompanying drawing in which Fig. 1 is a side sectional view illustrating the relative arrangement of parts of an electrode holder embodying my invention, and Fig. 2 is a perspective view of a part of the switch structure of the electrode holder of Fig. 1.

In the electrode holder shown in Fig. 1 an electrode 10 is clamped against the end of a terminal block 11 by a screw 12. The screw is threaded into the end portion of the terminal block and has a transverse passageway 13 through which the electrode extends. This passageway is provided with a wedge shaped surface 14 which engages the electrode and forces it against the recessed end of the terminal block into which the screw is threaded. The screw is also provided with a slot 15 in its end portion into which a new electrode may be inserted and used as a lever for turning the screw out of the terminal block to release the stub end of a used electrode before inserting the new electrode into the passageway 13 and using it as a lever to turn the screw into the terminal block and thus clamp the new electrode in the holder.

It will be seen that by reason of the construction employed the electrode 10 is firmly held by a three-point suspension between the wedge shaped surface 14 and the end of the terminal block 11. By reason of the three-point contact a slight bending action is exerted on the electrode which assists in holding it in place. Furthermore, as the screw is turned into the terminal block the electrode makes a rubbing engagement with the end of the terminal block just prior to being clamped against it and this rubbing engagement removes any scale or foreign material on the electrode or the end of the terminal block insuring a good electrical connection between these parts.

The clamping screw 12 may be a bolt, as illustrated in which the transverse passageway and slot are formed in its head portion. With such a construction the end of the terminal block may be recessed for the reception of the bolt head. This recessing also protects the threaded end portion of the bolt from spattered weld metal, as is clearly apparent from a consideration of the drawing.

The terminal block 11 is inserted in the front end of a hollow handle 16 and is provided with means for connecting it to a welding current conductor 17 which may extend through the rear end of the handle. This means may comprise a socket in which the welding current conductor 17 is inserted and held in place by soldering or a mechanical fastening.

Depending on the variation in size of the electrode 10 and the wear of the parts of the screw clamp, it is apparent that the electrode 10 may assume various radial positions relative to the handle 16. In accordance with my invention I provide the electrode holder with a control switch having an operating member surrounding its handle and accessible in all hand grip positions so that irrespective of the radial position of the electrode to the handle the welder may easily operate the switch by his gripping hand.

The switch illustrated comprises two annular conductors extending around the handle and forming the cooperating parts of a control switch. These members are biased out of engagement with one another and may be moved into engagement with one another by an operating member to complete a circuit through them. As shown in the drawing the switch comprises a plurality of conducting rings 18 and 19 supported on the handle 16 and separated from one another by a ring of insulating material 20. These rings 18, 19 and 20 are attached to the handle by pins or similar fastenings. The construction of these rings and their positions relative to one another will become apparent from a consideration of Fig. 2. It will be noted that ring 19 is provided with an upstanding flange and is connected to a control conductor 21. Ring 18 is connected by a terminal 22 to a control conductor 23. These control conductors may form a part of the welding current cable and extend through the rear portion of the handle as illustrated. Rings 18 and 19 are enclosed by a conducting sleeve 24. This sleeve is biased out of engagement with the flanged portion of ring 19 and toward a collar 25 by a conducting spring 26, which is located between ring 18 and a flange on the sleeve 24. The sleeve 24 does not rest directly against the collar 25 being supported by a sleeve 27 having a beveled end portion which fits within a recess 28 in the collar 25. The sleeve 24 may be tilted from its biased position into engagement with the ring 19 through the agency of an operating member 29 supported by the sleeve 27 and provided with a skirted portion extending toward the rear part of the electrode holder. When the sleeve 24 has been moved into engagement with the flanged portion of the ring 19 a control circuit is completed from conductor 23 through terminal 22, ring 18, spring 26 and sleeve 24 to conductor 21 which is connected to ring 19. It is apparent that by reason of the switch construction employed, the sleeve 24 is tiltable in any direction from its biased position into engagement with the ring 19. Thus irrespective of position of the holder in the welder's hand, which will vary by reason of the nature of the electrode clamp employed, the control switch is always conveniently accessible to that hand.

The collar 25 may form an integral part of the handle of the electrode holder or may be attached to the holder by screws extending through the handle and engaging the terminal block 11 as illustrated. This collar may be of sufficient size to form a guard for the switch mechanism and prevent operation of the same when the electrode holder is laid down. It may also be of sufficient size to form a shield to protect the welder's hand from spattered or falling weld metal. The guard 25 and the sleeve 24 as well as the handle 16 are made of insulating material.

The terminal block 11 may be formed of copper or brass or similar electrical conducting material. It is particularly advantageous to use an alloy of the composition disclosed in Patent No. 1,957,214, Edward H. Horstkotte, granted May 1, 1934, since the terminal block 11 is a pressure exerted electrode of the type disclosed in this patent and can be used with the advantages pointed out in this patent.

It is apparent that an electrode holder embodying my invention is not limited to the particular construction illustrated in the drawing and described above. I aim, consequently, to cover by the appended claims all those modified arrangements that may be provided without departing from the spirit and scope of my invention.

What I claim as new and desire to secure by Letters Patent of the United States is:

1. An electrode holder comprising a handle, a terminal block supported by said handle, a screw threaded into the end portion of said terminal block and having a transverse passageway with a wedge shaped surface through the agency of which an electrode inserted in said passageway is clamped against the end of said terminal block by said screw, and means for connecting a welding current conductor to said terminal block.

2. An electrode holder comprising a hollow handle, a terminal block inserted in the front end of said handle, a screw threaded into the end portion of said terminal block and having a transverse passageway with a wedge shaped surface through the agency of which an electrode inserted in said passageway is clamped against the end of said terminal block by said screw, and means on the inner end of said terminal block for connecting thereto a welding current conductor extending through the rear end of said handle.

VERNI J. CHAPMAN.